United States Patent [19]
Feistel

[11] 3,798,360
[45] Mar. 19, 1974

[54] STEP CODE CIPHERING SYSTEM

[75] Inventor: Horst Feistel, Mount Kisco, N.Y.

[73] Assignee: International Business Machines Corporation, Armonk, N.Y.

[22] Filed: June 30, 1971

[21] Appl. No.: 158,174

[52] U.S. Cl. ................................ 178/22, 340/172.5
[51] Int. Cl. .............................................. H04l 9/02
[58] Field of Search .......................... 178/22; 331/78

[56] References Cited

UNITED STATES PATENTS 3,522,374 7/1970 Abrahamsen et al. ................ 178/22

*Primary Examiner*—Benjamin A. Borchelt
*Assistant Examiner*—H. A. Birmiel
*Attorney, Agent, or Firm*—Victor Siber

[57] ABSTRACT

This specification discloses a system that provides multiple level encipherment of a block of data by means of a stepped block cipher process. A data stream consisting of digital information is segmented into blocks of dimension D, each block is enciphered by means of a block cipher cryptographic system operating under the control of a unique subscriber digital key. The cryptographic system develops a first cipher text of equal dimension as the block D. Then the cryptographic system is effectively shifted to accept a plurality of data bits from a second data block and a plurality of bits from the first cipher. The combination of block data bits and ciphertext data bits forms a composite block of dimension equal to the data block D. This combination is introduced to the cryptographic device for developing a second cipher text. The combined output of the second ciphertext and those information symbols from the first ciphertext which were not reintroduced to the cryptographic device are transmitted as a complete unit to a receiving station which will decipher the received multiple level cryptogram by an inverse process.

The multiple level encipherment process is also utilized in a variant key embodiment which would encipher a data block D into a cipher C which is a function of a key control block consisting of a random combination binary digits that are continuously changing.

In a further embodiment which utilizes multiple level encipherment, there is presented a method for providing secrecy in communications between a central processing unit and its data banks.

7 Claims, 9 Drawing Figures

INVENTOR
HORST FEISTEL

BY Victor Siber
ATTORNEY

| | | |
|---|---|---|
| FIG. 3A | FIG. 3B | FIG. 3C |
| FIG. 3D | FIG. 3E | FIG. 3F |

STEP CODE CIPHERING SYSTEM

CROSS-REFERENCE TO RELATED APPLICATIONS

Reference is hereby made to application Ser. No. 158,360, of Horst Feistel and entitled "Block Cipher Cryptographic System," and to application Ser. No. 158,183, of Horst Feistel filed concurrently with the instant application and entitled "Centralized Verification System."

BACKGROUND OF THE INVENTION

The present invention relates to the art of cryptography. More particularly, it relates to a new method of coding by means of a block cipher cryptographic system, which method may be utilized in a data processing environment.

With the growing use of remote-access computer networks which provide a large number of subscribers with access to data banks for receiving, storing, processing and furnishing information of a confidential nature, the question of data security has come to be of increasing concern. Furthermore, with the development of telecommunication equipment capable of interconnecting a terminal to a central processing unit via telephone communications lines, the possibility that confidential communications might be subject to unauthorized tapping by an unscrupulous individual, is greatly increased.

While in the art of cryptography it is generally known that signals may be coded or encrypted in some fashion so as to defy analysis and understanding by an enemy, such coding or encryption techniques have not yet been applied to the data processing arts. Thus, communications, within a data processing network which contain confidential information such as business records, customer listings, technical trade secrets, etc., are highly susceptible to appropriation by unscrupulous individuals. At the present state of technology, data processing networks rely on various identification techniques to limit the availability of the network to certain restricted personnel. However, as data communications networks continue to proliferate, it has become more increasingly difficult to limit the number of individuals that are capable of communicating with the central processing and data file equipment within the computer network.

OBJECTS OF THE INVENTION

Therefore, it is an object of this invention to provide a cryptographic coding process to maintain privacy of communications in a data processing network.

It is another object of the present invention to provide a step cipher process for enciphering digital data that is to be transmitted between a terminal and a central processing unit over a communication channel that is subject to unauthorized monitoring.

It is a further object of the present invention to provide a cryptographic communication system wherein the cipher is developed under the control of two separate keys, a block of binary digits associated with each subscriber of the system, and a random set of binary digits which are simultaneously available at both transmitting and receiving stations within the communications system.

It is another object of the present invention to provide a cryptographic process for maintaining privacy of data communicated between a central processing unit and its data banks.

SUMMARY

In accordance with this invention, a step cipher cryptographic process is provided which insures privacy of communications between a plurality of terminal devices and a central processing unit (CPU) in a data processing network. A first embodiment presents a process for implementing a multiple cipher from a continuous input data stream that is to be transmitted. Each block cipher developed by a cryptographic device is comprised in part of data that has been twice enciphered by the same cryptographic device. At the receiving station, a decipher process is carried out in an inverse procedure thus enabling a full recovery of the data on a block by block basis. The multiple encipherment of the continuous data stream is implemented by introducing blocks of data from said data stream to a block enciphering cryptographic device which operates under control of a key consisting of a unique combination of binary digits. A portion of the cipher text developed during the first encryption is stored and the remaining portion is re-enciphered in combination with new data bits to form a second ciphertext which is combined with the stored portion of the first cipher text to form a new composite block cipher that is transmitted.

In a second embodiment, a cipher process is presented for developing a variant cipher which is dependent on the binary levels of the input data itself. In the process, a random combination of binary digits is utilized to form the key for operating the cryptographic device that develops the first cipher block. Then, a portion of the first cipher block is stored and the remaining portion is combined with the same randomly generated binary digits to form a second ciphertext. The second ciphertext and the stored portion of the first cipher text are then combined to form a new composite cipher block that is transmitted.

The foregoing objects, features and advantages of the invention will be apparent from the more particular description of the preferred embodiments of the invention, as illustrated in the accompanying drawings.

DETAILED DESCRIPTION OF THE INVENTION

Figure 1:
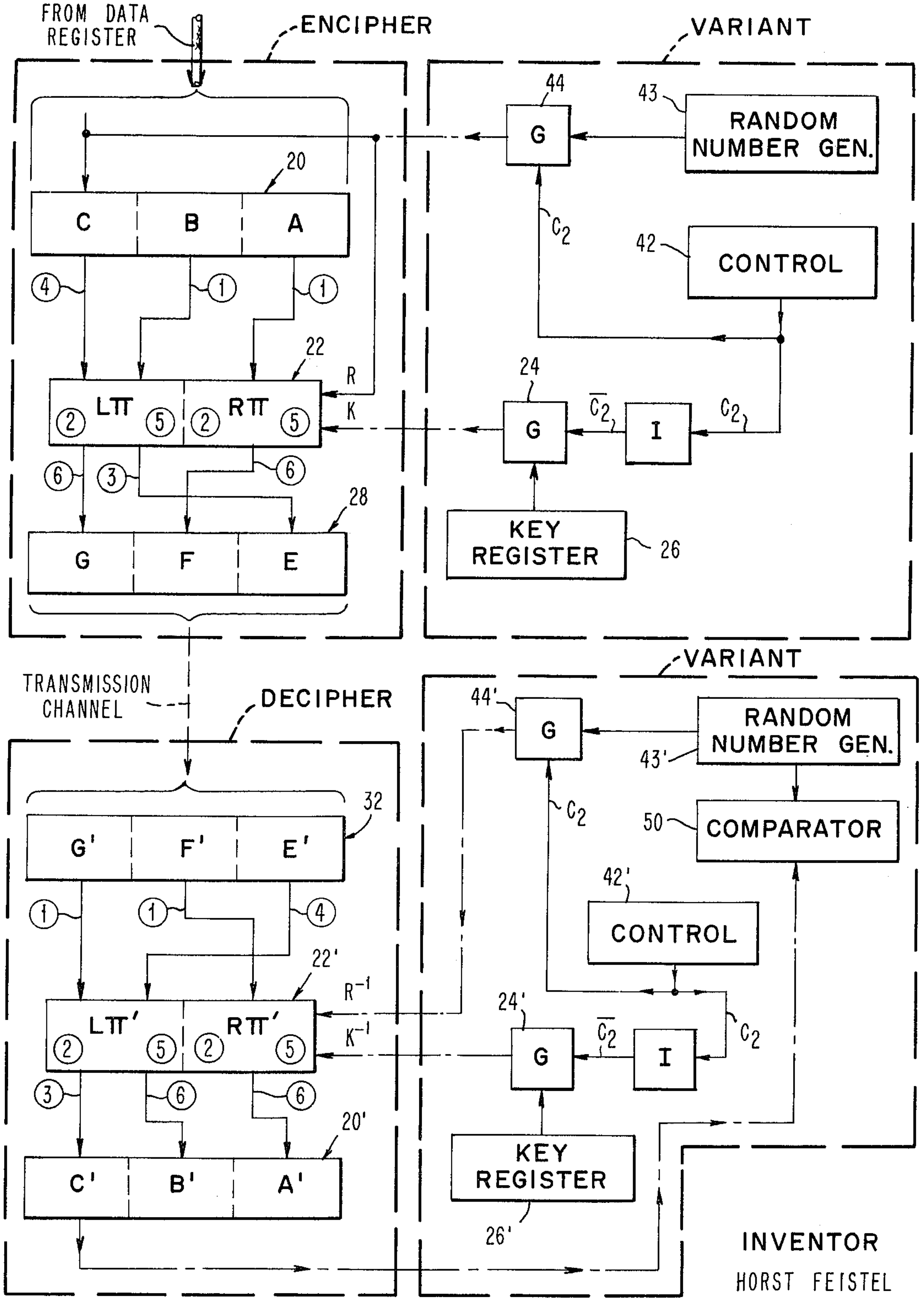
FIG. 1 is a block diagram representation of a system for implementing the step cipher process with either a fixed user key or with a variant key.

Referring to FIG. 1, there is shown a block diagram representation of a system for implementing multiple level encipherment. This system is used in data communications between a transmitter and receiving station. For example, in a large computer network consisting of a CPU and a plurality of terminals connected to the central processor by either direct channel or telecommunication lines, messages or blocks of data, are enciphered at the transmitter terminal and are then deciphered at the receiving site. Note that the central processor and the terminals each have the capacity to act as both transmitter and receiver. At each station there exists a data register (not shown) in which binary symbols are stored prior to encipherment.

In a central processor, the data register accumulates data obtained from some data bank as requested by the subscriber which is utilizing the terminal, or in the case of a terminal, the data register accumulates keyboard information entered by the user of the terminal. At some point in time, when sufficient data is accumulated in the data register to comprise a data block of proper dimension for enciphering, the entire block consisting of segments A, B, and C is stored in feed register 20. For the purpose of illustration, feed register 20 is identified as having the capacity of storing 192 bits of data and each of the segments A, B, and C consist of 64 bits in dimension. However, it should be recognized by those skilled in the art, that the principles of this invention are not limited to any particular data feed register size nor to any particular division of segments within the feed register. Thus, segments A, B, and C may each be of any size.

Within the following description of the process as carried out by the system of FIG. 1, steps in the process are represented by numerals which are encircled, each numeral designating the particular sequence step of the process. After the data block A, B, C is stored in feed register 20, segments A and B are loaded into a cryptographic block cipher device 22 which is figuratively represented as consisting of left and right half sections Lπ and Rπ, respectively. The Lπ and Rπ sections are utilized herein merely for the purpose of describing the shift of information to and from the cryptographic system 22. It should be understood, that in actuality no physical division exists between portions of the cryptographic system 22 and that the Lπ and Rπ sections are, in fact, one complete block of binary digits within the cryptographic system 22. An exemplary cryptographic block cipher system is described further in this specification, and other embodiments are presented in U. S. Patent application Ser. No. 158,360.

Following step 1, the Rπ portion of the cryptographic device contains segment A and the Lπ portion contains segment B. Both A and B data segments are in cleartext form and are enciphered by the cryptographic system 22 into ciphertext E,X. Cryptographic system 22 executes a specified number of transformations within its internal registers and circuitry to completely encipher the cleartext block A,B, into a ciphertext block represented as E,X. This enciphering step is identified as step number 2. The segment X remains in the Rπ portion of cryptographic system 22 for a subsequent encipherment and is not shown in the diagram. The ciphertext EX is a function of a unique combination of key binary digits K arranged in a block and assigned to the particular subscriber or user of the computer network. The unique user key K is introduced to cryptographic system 22 by means of gate 24 which permits the block of binary digits K from key register 26 to operate as the control for the ciphertext generated by cryptographic system 22. The ciphertext EX which can be thought of as having of two parts, a first part E consisting of 64 bits appearing in the left half or Lπ sectionof cryptographic system 22 and a second half X consisting of 64 bits appearing in the right half or Rπ section of the cryptographic system 22. The Lϕ portion E, of the cipher block is transferred to a transmit register 28 and is maintained there until transmit register 28, which is 192 bits in dimension, is completely filled up. The transfer of the subportion of the cipher text E is indicated as step number 3.

Following step 3, the X portion of the ciphertext remains in the Rπ section and is multiple enciphered in combination with a new subgroup of 64 data bits C transferred from the feed register 20 to the Lϕ section during step 4. Now, having a full 128 bits of binary representations in the cryptographic system 22, the system repeats the enciphering process identified during step 5 to develop a new cryptogram or cipher block GF consisting of 128 bits. This cipher block GF is then transferred to the transmit register 28 during step 6, the subgroups G and F being arranged serially, following the cipher group of bits E. At this point in time, transmit register 28 is fully loaded, and the composite block E, F, G is transmitted over a communications channel or line to a receiving unit. During the steps 1–6 which are carried out in the enciphering portion of the system shown in FIG. 1, it is assumed that data is simultaneously being accumulated in the data register (not shown) in anticipation of storage in the feed register 20 as soon as the register 20 is available.

At the receiver station, a deciphering process is executed in an inverse fashion relative to the enciphering process carried on at the transmitter station. Note that all segments are identified by a prime designation to indicate that they relate to the decipher operation. Furthermore, the user key which has been preassigned for the unique subscriber operating the system, is represented by $K^{-1}$ which symbolically represents the reverse application of the key binary digits K from the key register 26' and gated through gate 24' to control the cryptographic system 22'.

The transmitted ciphertext composite block E,F,G as transmitted is accepted into receiving register 32 at the receiver station and is identified for purposes of illustration herein as E',F',G'. Step 1 in the decipher operation consists of transferring the F' and G' subgroups from the receiving register 32 to the Rπ' and Lπ' sections. The cryptographic system 22' operating under the control of the user key $K^{-1}$ deciphers the cryptogram F'G' into a clear text block C',X'. This deciphering operation is identified as step 2. The C' subgroup is then transferred to feed register 20' during step number 3. Then, the E' subgroup of the received cipher block is loaded into Lπ' during step 4. At this point in time, cryptographic system 22' is again activated to execute a decipher operation during step 5 in order to decipher E',X' into clear text subgroups A', B' which are then transferred into feed register 20' during step 6. The resulting clear text block A',B',C' consisting of 192 bits of binary information correspond exactly with the clear text block A,B,C which was enciphered at the transmitting station.

While the above process is described in terms of a multiple encipherment operation consisting of two enciphering processes, it should be recognized by those skilled in the art that any number of multiple cipher operations may be carried out in order to develop a ciphertext block prior to transmission. Furthermore, the size of the subgroups in both the data blocks and the segmentation of the data blocks in the cryptographic system are a matter of design choice.

VARIANT CIPHER OPTION

The above description of the system shown in FIG. 1 illustrates the cipher and decipher operation under the control of the user key K and $K^{-1}$. In certain instances where it is desirable to have a higher degree of data security, the clear data is enciphered under the control of two separate and distinct keys in a multiple encipherment process. The degree of security as used within this specification relates to the probability of guessing the unique combination of key binary digits by an opponent having both the knowledge of the internal circuitry of the system and the opportunity to observe prior transmissions and resulting ciphers. The variant option which operates under control 42 applies a combination of binary bits identified as R during the first enciphering operation in the multiple cipher process. The unique combination of binary digits R are introduced into cryptographic system 22 by applying a control signal $C_2$ to gate 44 which enables a random number key generator 43 to supply some unique continuously varying combination of binary digits to a key register within the cryptographic system 22. This same random number consisting of a random arrangement of binary digits is simultaneously loaded into one of the segments of the data block appearing in feed register 20. An exemplary random number generator may be found in U.S. Pat. No. 3,366,779, issued Jan. 30, 1968. Also, it is possible to compute a set of random numbers in accordance with the teachings in Handbook of Mathematical Functions, U.S. Department of Commerce, National Bureau of Standards, Applied Mathematics Series 55, 1964, Chapt. 26, Sec. 8, and store a table of random numbers for further access. Note that if the random control key R requires a greater dimension of binary digits than is available in the actual random number generated, the number developed by random number generator 43 may be padded with some fixed combination of bits.

Number R is loaded into feed register 20 within segment C. Then, the cryptographic process continues in the same manner and executes the same number of steps 1–6 as described above. Note that when the control 42 activates the variant cipher, an inverse control signal $\bar{C}_2$ deactivates key register 26 by opening gate 24, during the period of time when the first cipher operation is executed. Then, control 42 opens gate 44 and closes gate 24 to permit the second cipher operation to develop a cipher text which is a function of the user key K.

In the deciphering operation at the receiver station, the variant control key $R^{-1}$ is provided by an identical random number generator 43' operating in synchronism with the generator 43 in the transmitter. The only additional feature provided in the deciphering sequence is an additional error-checking facility which is carried out by comparator 50. Both the receiver and transmitter stations, which at any point of time could be either the terminal or CPU within a data processing network, have an identical random number generator 43. Thus, upon deciphering the subgroup C' which consists of the random number R, a comparison check is performed. A mismatch detected by comparator 50 indicates that an error is present due to either a faulty transmission line or a processing error created by the cryptographic systems 22 or 22'.

SECURED DATA EXCHANGE BETWEEN CENTRAL PROCESSOR AND ITS DATA BANK

The system as described above, while particularly useful in an environment where transmissions take place between a terminal and a central processor, has further application to communications between a central processor and its data banks. Just as communication channels are subject to unauthorized tapping, similarly, channels between central processors and their storage banks consisting of tape drives, disk units, magnetic recording drums, and other storage mediums, are also susceptible to unauthorized monitoring. By means of enciphering data that is communicated between the central processor and the storage devices, privacy of the information within the data banks can be insured. With the recognition of the fact that a lesser degree of confidence may be attached to various types of information found within a data bank file, the system described above is modified to provide a fast multiple enciphering process which does not significantly affect processing time during the storage and access of data from the central processor and to the storage devices in the network.

All data records that are stored within the data files are assigned a file tag F. This file tag F consists of digital indicators which denote whether a particular file topic is present in the encrypted file record attached to the file tag F. Thus, for example, the first digit position in F might indicate whether or not a cryptogram whether or not financial information, the next digit contains inventory data, etc, is present. In general, the indicator tag F will not require the same level of security as its related data file record since the mere knowledge of the nature of the information does not reveal the details of the data which are proprietary. For this case, where the file tag F does not require encipherment, the data is passed through the cryptographic system 22 and stored within the data files in clear text.

In the case where the file tag information F is desired to have some assurance of privacy, the multiple ciphering system of FIG. 1 is activated in a special "file" mode. In this file mode of operation the cryptographic system does not execute the same number of rounds as required to develop a full crytogram, as explained in U.S. Patent application Ser. No. 158,360. Rather, a lesser number of rounds are executed under a special filing key $K_f$. By not having the usual number of rounds the multiple step cipher system operates much faster, thus permitting storage of data to be maintained private with a minimum loss of time.

MULTIPLE LEVEL ENCIPHERMENT WITH VERIFICATION

In a block cipher system, it is desirable to include within each message block one or more bytes to be used for the purpose of verification. This verification field can be utilized as a password in a challenge-reply authentication procedure such as disclosed in U. S. Pat. application Ser. No. 158,183, to ensure the continuity and validity of each block of a message, and also to ensure that identical stereotyped messages will be enciphered differently through the use of a unique initial verification field.

The step cipher as described with reference to the system of FIG. 1 is a cipher in which a cleartext block to be enciphered is made to consist of X message bytes and Y bytes for verification. After encipherment, X bytes of the cryptogram are transmitted and Y bytes are saved to be appended to X new message bytes to make up the second block to be enciphered, etc. At the receiver, blocks of ciphertext so prepared are deciphered in the reverse order, and the last one deciphered will contain the verification field.

Figure 2:
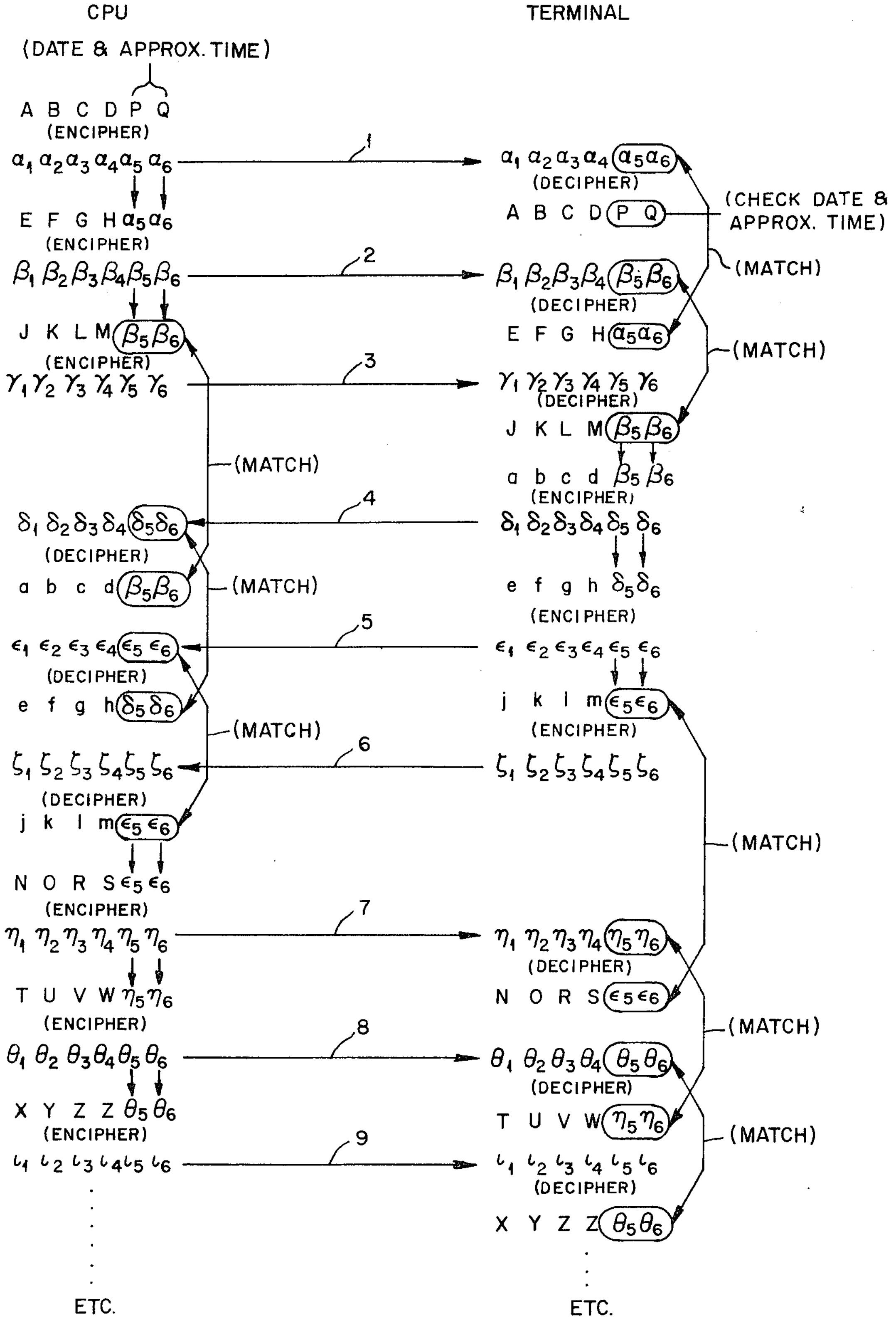
FIG. 2 is a flow diagram of data transmissions in a system using step ciphering process which also provides error checking.
Figures 3, 3A:
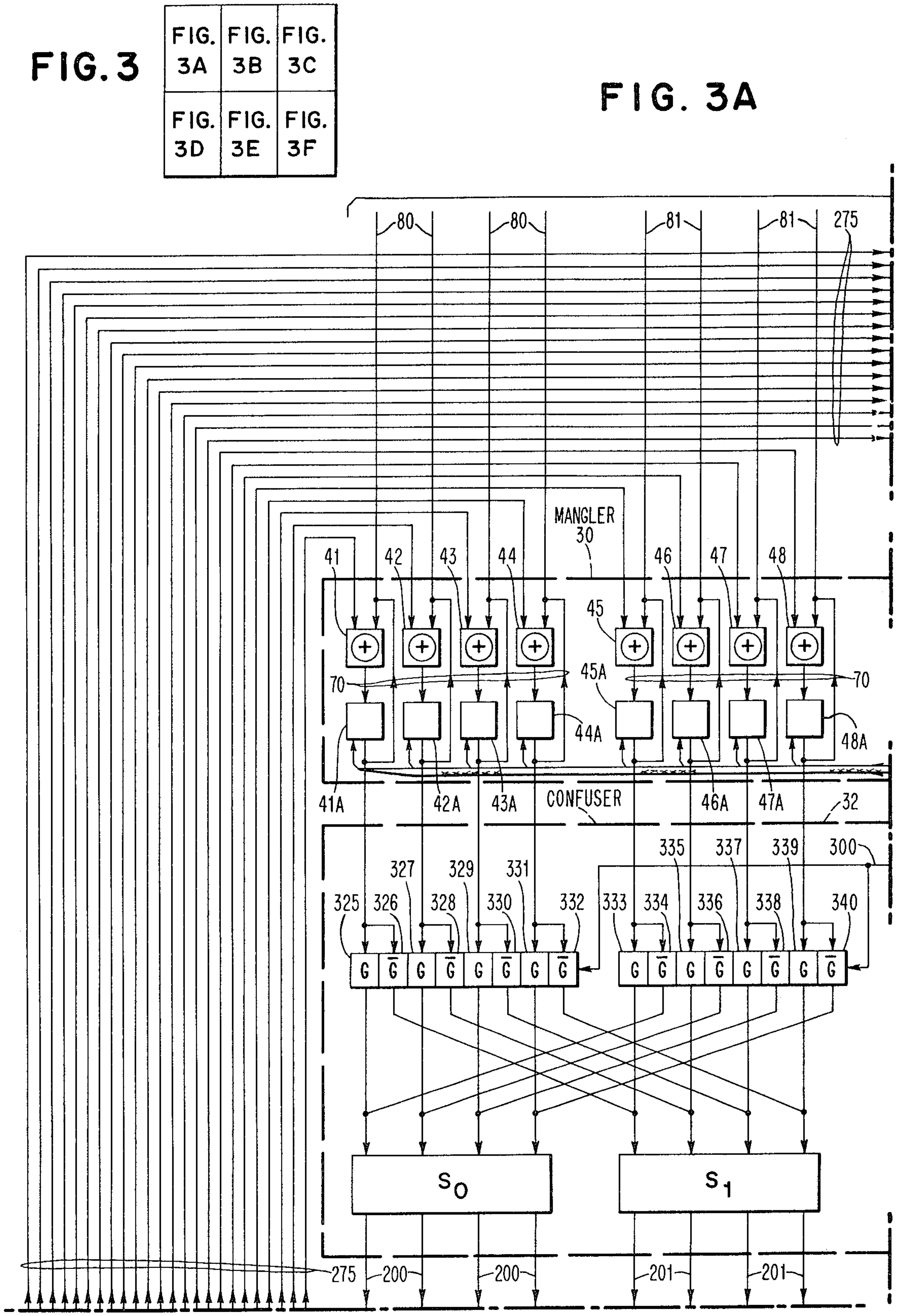
FIGS. 3A–F are a detailed schematic diagram of one embodiment of a block cipher cryptographic device which may be utilized in the step cipher processing system.
Figure 3B:
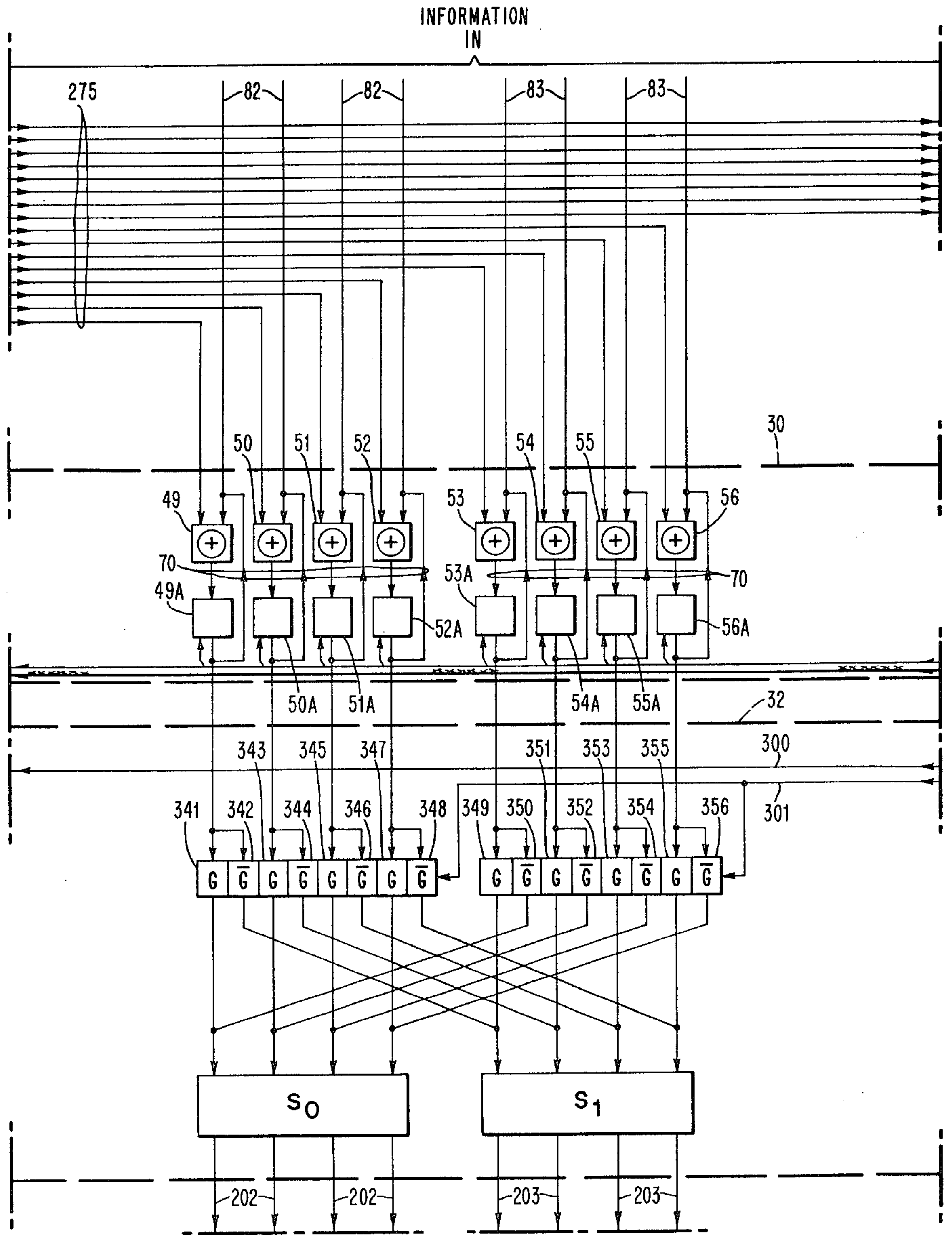
Figure 3C:
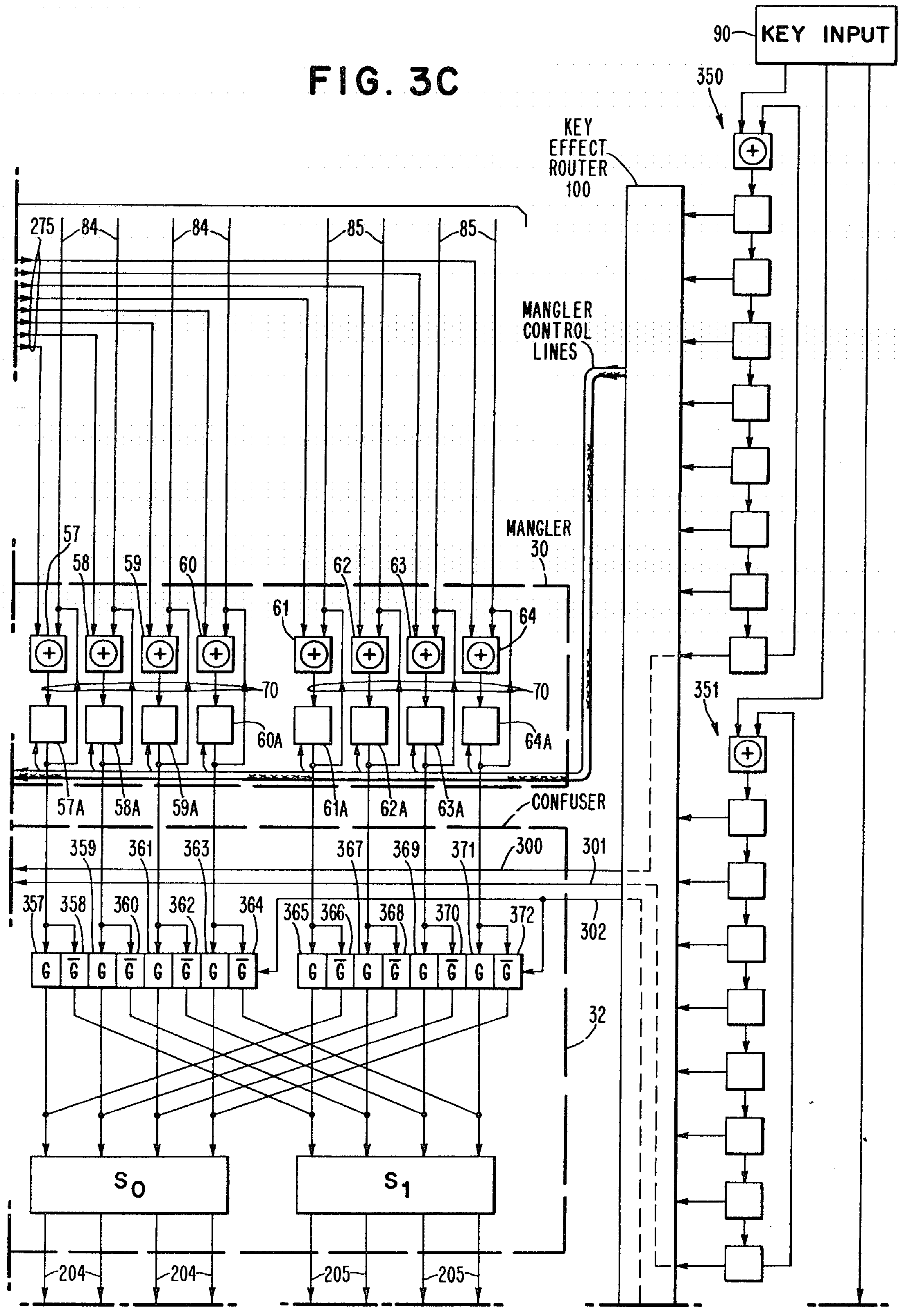
Figure 3D:
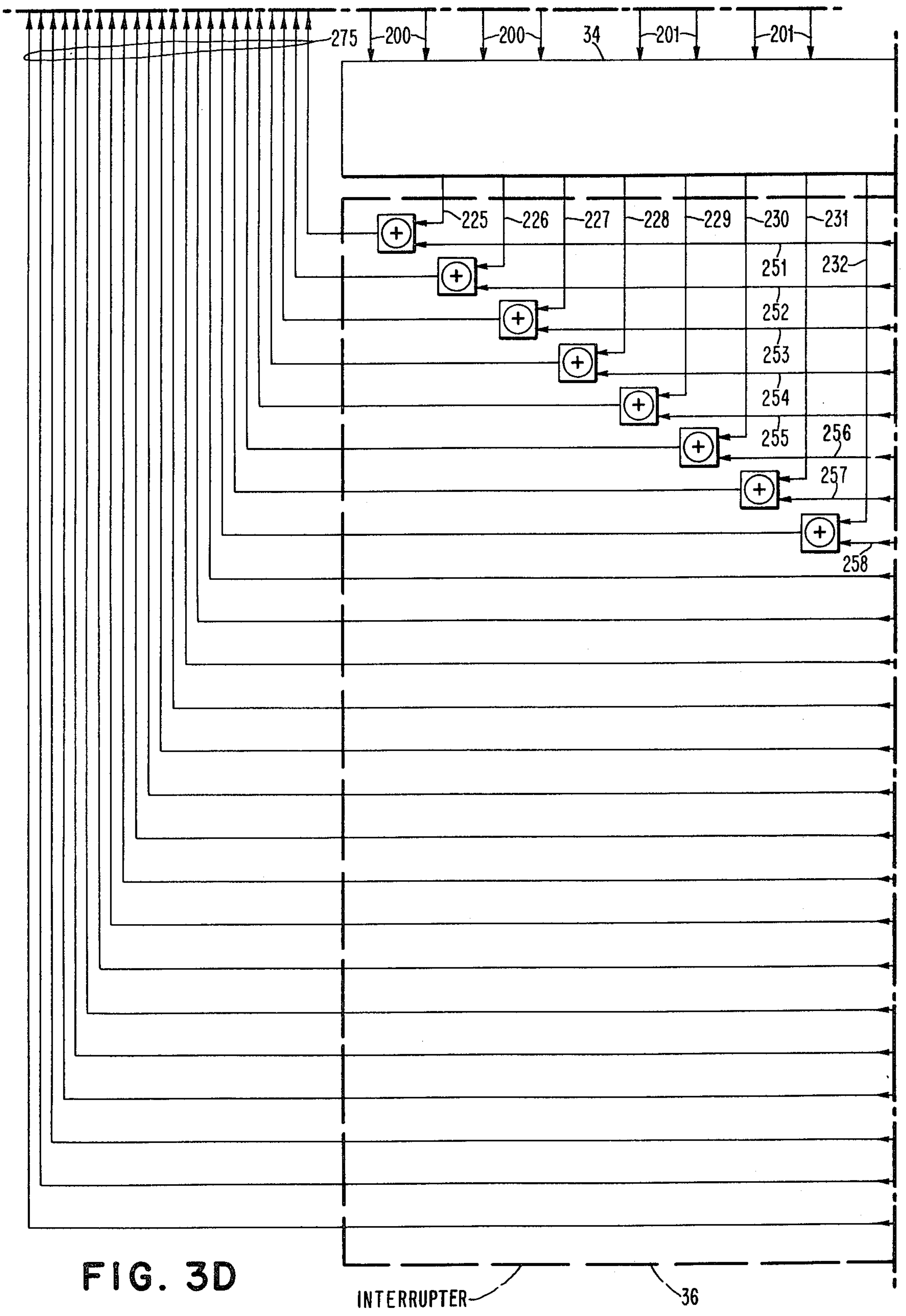
Figure 3E:
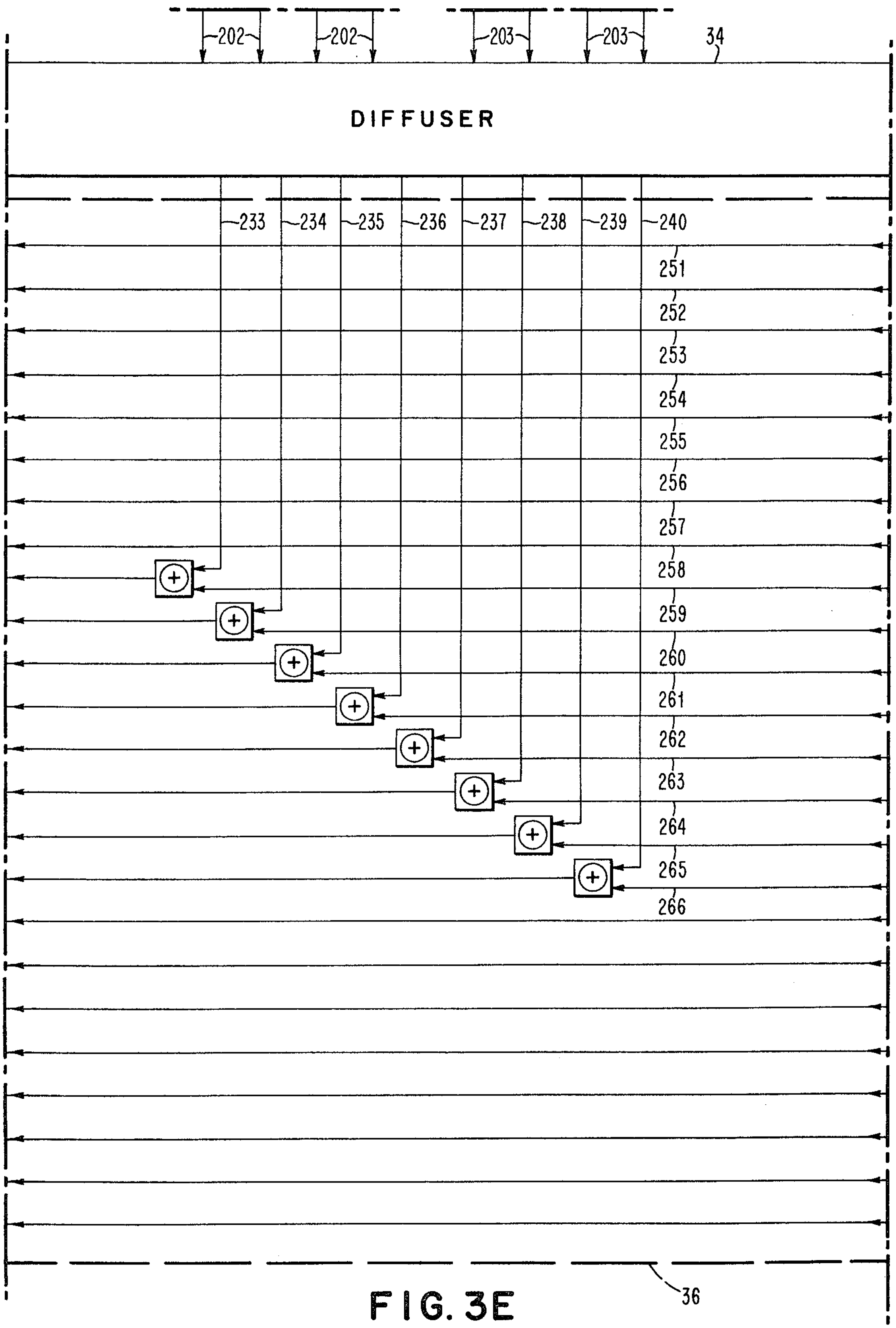
Figure 3F:
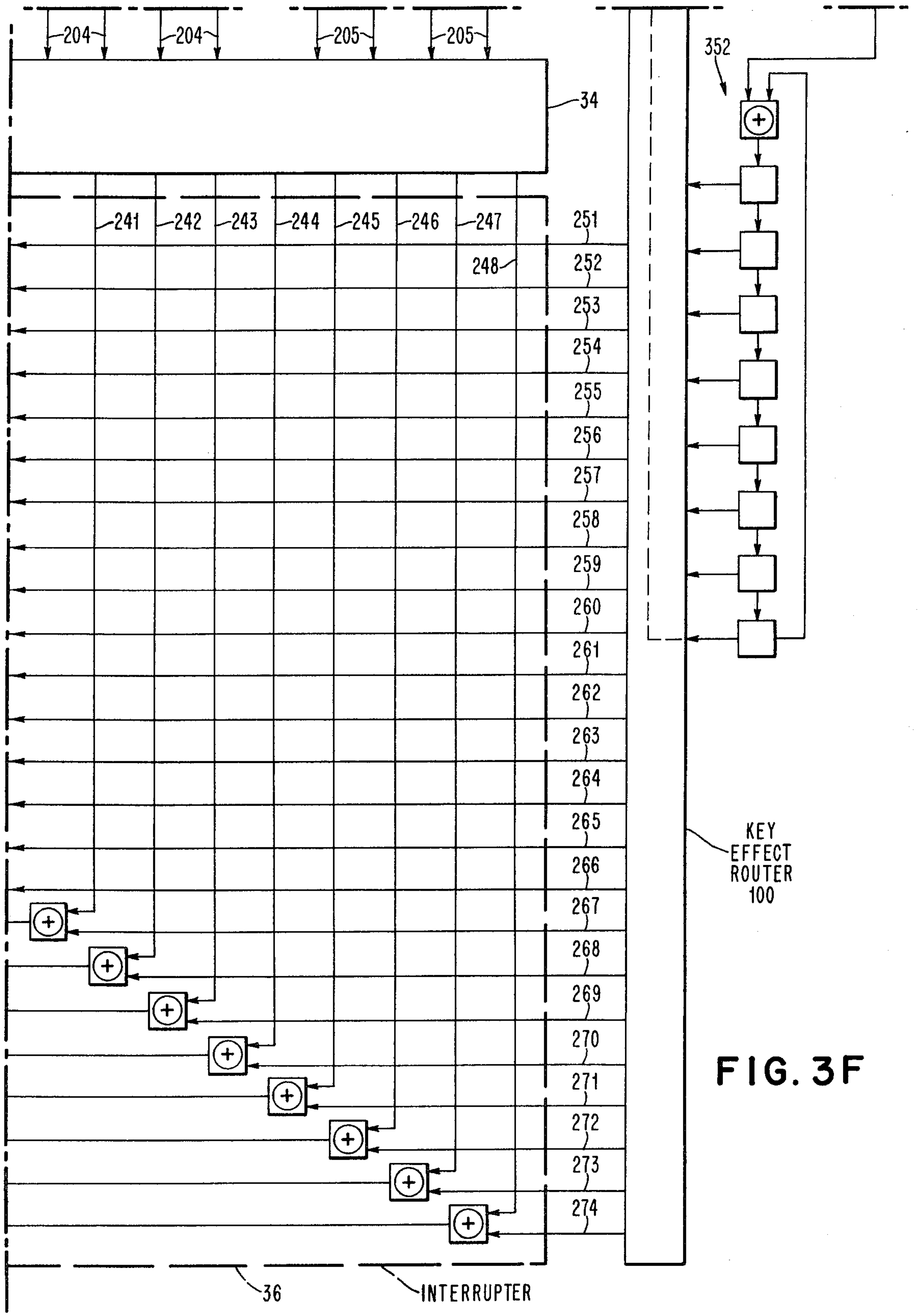

Referring to FIG. 2, there is shown a method for carrying out the step cipher so that, instead of transmitting only X bytes of each cryptograph block, the entire block (X + Y bytes) is transmitted. By this procedure, the entire cipher text is greater in length than the message by the factor (X + Y)/X, but the cryptogram blocks may be deciphered at the receiving station in the same order as they are received. For purposes of illustration, X has the value four, and Y the value two. Clear text messages originating at the CPU are shown in upper-case Roman letters, and clear text originating at a terminal is shown in lower-case Roman letters; cipher text is shown in lower-case Greek letters.

The initial cleartext message to be sent from the CPU is represented to be ABCDEFGHJKLM. The first block to be enciphered is ABCD to which is appended PQ, here denoting the unique date and time. Encipherment produces the cipher text block represented by $\alpha_1$ through $\alpha_6$, which is the content of the transmission labeled 1. The second block comprises EFGH and the bytes $\alpha_5$ and $\alpha_6$ which are retained from the previous cipher text block. This second block is enciphered into $\beta_1$ through $\beta_6$ which is the content of transmission 2. This process continues as indicated in the FIG. 2, until the message is exahusted.

Because all cipher text blocks are self-contained and independent, they can be deciphered in the order received and, with means for saving the verification fields of only the current and immediately preceding cipher text blocks, a complete check on the validity of every block of the message can be conducted. In FIG. 2, the fields which are to be compared for exact matches are indicated by double-headed arrows.

For any subsequent message, the initial verification field is obtained from the last deciphered clear text block; otherwise the composition of the blocks is as previously described to yield ciphertext for transmissions 4, 5 and 6, and 7, 8 and 9, etc.

This process can continue for interchanges of messages of indefinite length, while providing a method of maintaining a continuous check on the validity of each block throughout. Under the condition that the initial primer verification field PQ is unique, there is virtual certitude that the cipher text for an entire interchange of messages will never be the same twice, even for identical clear text.

An error in transmission of any cipher text block will destroy the information contained in that block and when it is deciphered the matching of the verification field will almost certainly fail; but because each cipher block is independent, this error will not propagate to any subsequent (error-free) block.

THE CRYPTOGRAPHIC SYSTEM

Referring now to FIGS. 3A–3F, there is shown a detailed schematic diagram of an embodiment of the cryptographic system 22 and 22'.

A data block D which is to be enciphered by the cryptographic system is loaded into the mangler 30 by means of information lines 80, 81, 82, 83, 84, 85 and 86. Each of these information lines are arranged in quadruplets which are associated with a quadruplet set of two bit shift registers 41–64. Each shift register consisting of upper storage elements 41–64 and lower storage elements 41*a*–64*a*. The binary data which is stored in each of the upper and lower elements of the shift register sub-sections, which form the message D, may be shifted up or down in each of the two bit shift register sections depending on the binary values that appear on the mangler control lines emanating from the key effect router 100 to the mangler 30.

During the first round of the cryptographic system, the mangler 30 performs no initial operation on the message data D. The lower 24 bits within the storage elements 41*a*–64*a* are loaded into a plurality of gates G and $\bar{G}$, each pair of gates receiving one output from the mangler 30. For example, gates 325 and 326 receive the output line from lower storage element 41*a*. The quadruplet of shift registers which receive the quadruplet of information *n* lines have associated therewith a set of four pairs of gates G and $\bar{G}$, each gate being activated by one of the control lines 300, 301 and 302. Depending on the binary signal values on the control lines 300, 301 and 302 either the gate G or $\bar{G}$ will be activated for controlling the passage of information to a particular substitution unit $S_0$ or $S_1$. Each substitution unit consists of a decoder and encoder section with a random interconnection of wires between the output of the decoder and the input of the encoder, as shown in FIGS. 5A and 5B of application Ser. No. 158,360. By this simple device, it is possible to develop one out of $2^n!$ possible permutations for *n* input lines. The substitution as carried out by the $S_0$ and $S_1$ units effects a nonlinear transformation of the output of mangler 30.

Following the substitution, the outputs of the $S_0$ and $S_1$ units which are arranged in quadruplets 200, 201, 202, 203, 204, 205 and 206 are fed into diffuser 34 which carries out a linear transformation of the binary signal levels at the input and re-arranges the pattern of 1's and 0's depending on the interconnection of wires between the input and output of the diffuser 34. The outputs of diffuser 34 which appear on output lines 225–248 are fed into a plurality of mod-2 adders which carry out an exclusive OR between the output lines of diffuser 34 and the binary values derived from the key effect router 100 and appearing on lines 251–274. Each mod-2 output, is then fed back along lines 275 to be re-introduced into the mod-2 adders in the upper storage elements 41–64 of mangler 30. At this point in time, mangler 30 effects a plurality of shifts within each of the two-bit shift register sections depending on the binary signal values routed from the effect router 100 by means of the mangler control lines.

Following the operation performed by mangler 30 the $\pi$ cryptographic system is said to have completed a first round of encryption. For subsequent rounds, each of the cyclic key subgroup registers 350, 351 and 352 is shifted one bit position. Thus, at the end of eight rounds of encryption, the data in each of the subgroup key registers 350, 351 and 352 is identical to that which appeared in the registers at the beginning of the encipherment process. While this embodiment has been described with reference to a cryptographic system that executes eight rounds, it should be recognized by those skilled in the art, that it is possible to operate the cryptographic device for more or less rounds and thereby achieve various complexities of re-arrangement of information.

What is claimed is:

1. A process for multiple level encipherment of a data block consisting of binary digits said process comprising the steps of:

arranging a stream of binary digit data into a plurality of data segments;

loading one data segment from said plurality of data segments into a cryptographic block ciphering device for first generating a block cipher;

following the first generation of a block cipher, retaining a portion of said block cipher and combining it with another data segment to form a composite data block;

loading said composite data block into a cryptographic block ciphering device for generating a composite block cipher;

sequentially generating composite block ciphers from said data segments until said data stream is exhausted.

2. The process as defined in claim 1 wherein said cryptographic system develops a block cipher under the control of a combination of binary digits obtained from a unique key code associated with a particular individual.

3. The process as defined in claim 2 wherein said combination of binary digits comprises:

a block of binary digits whose combination at any particular time is a random arrangement of one's and zero's.

4. The process as defined in claim 3 wherein pairs of ciphers are generated under alternate control of a subscriber key and a random combination of binary digits.

5. The process as defined in claim 4 further comprising:

combining said random combination of binary digits with portions of data segments for generating composite ciphers.

6. A process for multiple level encipherment and decipherment of a stream binary data digits comprising the steps of:

segmenting said data stream into a plurality of blocks each n digits in dimension;

loading at least one of said blocks of n-digits into a cryptographic device for developing a first block cipher:

storing a portion of said first block cipher into a storage means:

loading further ones of said blocks of n-digits into said cryptographic device to be combined with the remaining portion of said first block cipher;

forming a second block cipher from the combination of a further block and said remaining portion of said first block cipher;

combining said first and second block ciphers into a composite block cipher in said storage means prior to transmission;

transmitting said composite block cipher; receiving said composite block cipher at a receiving station and deciphering it by an inverse operation of said cryptographic device.

7. The system as defined in claim 6 wherein said block ciphers generated by said cryptographic device are alternately functions of a combination of binary digits associated with a particular subscriber to a computing network and a random combination of binary digit representations.

* * * * *